Nov. 9, 1926.  
A. E. OSWALD  
ELECTRIC MOTOR  
Filed Feb. 7, 1922
1,605,977
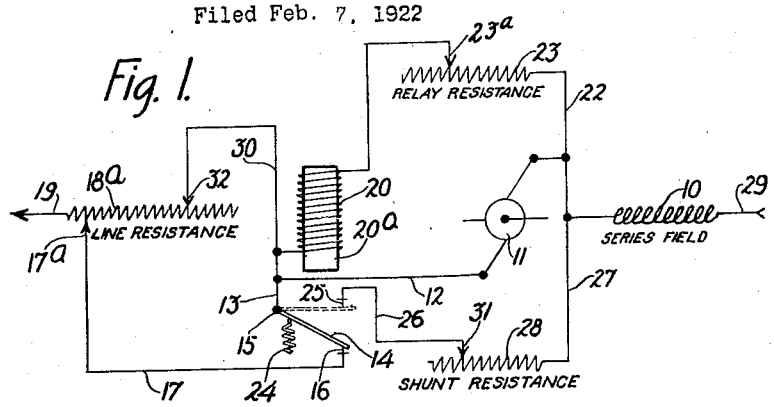
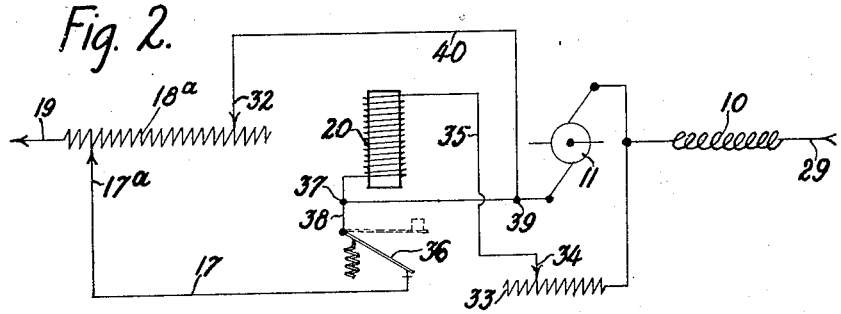
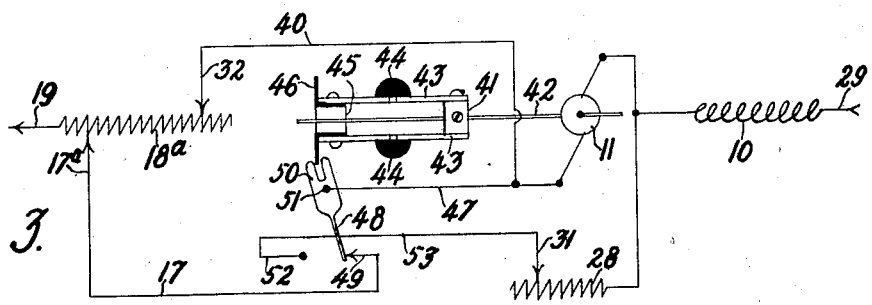
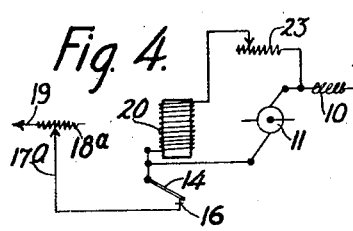
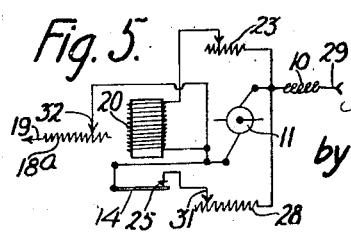
Inventor:  
Alfred E Oswald  
by BC Stickney  
Attorney Patented Nov. 9, 1926.

1,605,977

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

ELECTRIC MOTOR.

Application filed February 7, 1922. Serial No. 534,643.

This invention relates to improvements in universal and other electric motors.

One of the objects is to produce, in a universal motor, a device that will operate on either direct or alternating current, and such that it will start up instantly under load, and then operate at a practically constant speed under load, and not over-speed when relieved of part or all of its load, as does an ordinary series motor, but keep substantially uniform speed with varying loads or no load.

It is further an object to provide a motor that operates at substantially constant speed and is adjustable for starting torque and substantially constant speed values.

One of the main objects of the present improvements is to construct at low cost a simple, practicable motor which is adaptable for light work, preferably on either direct current or alternating current circuits, and which has a good starting torque and runs at nearly constant speed, and otherwise avoids the well-known objections, some of which have been noted.

In order to take a heavy starting current and have good starting torque, there is employed a series-wound motor, that is, the armature coil is in series with the field coil. To attain one of the objects of the invention, and prevent the motor from running at excessive speed, the motor, upon reaching the desired speed, is automatically caused to convert itself into a motor having a resistance in shunt around the armature, whereby the current will be divided between the armature and the shunt resistance, all of the current passing through the field coil; whereby the speed of the motor is brought under automatic control.

When the improved motor is at rest, there is little or no resistance in series with the whole motor, and none in parallel with the armature. This insures a good strong starting torque, as the armature and series field are directly connected across the line. If nothing else were done, the armature would start and speed away, as in the case of an ordinary series-wound motor; but, as the improved motor increases in speed, the counter-electro-motive force of the armature increases until the voltage drop across the armature brushes reaches a point where there is brought into action a device which in some respects resembles an automatic relay, which causes a resistance to be included in parallel with the armature for controlling its speed. This resistance controls the counter-electro-motive force of the armature, so that the armature will not rotate beyond a certain speed, depending upon how much resistance is in parallel with the armature. The higher this resistance, the more speed, and the lower the resistance, the less speed.

The throwing-in in this manner of considerable resistance in shunt around the armature coils, would incidentally produce a condition of risk; and, to meet this condition, there is provided means whereby, when the shunt resistance is brought into use, there is also brought into use automatically a resistance in series with the whole motor. This line resistance will reduce the current consumed by the motor, and avoid difficulty. Such line resistance permits the use of a motor for either direct or alternating current.

The invention is so constructed that the motor remains converted so long as it is running; but, when the current is cut off, or when the motor is stalled, it reconverts itself into a simple series field motor preparatory to again taking a heavy current and producing a strong torque upon restarting.

Another feature of the invention is the provision of adjustable means for regulating the speed of the motor, in which practically any speed can be maintained.

Other features and advantages will hereinafter appear.

In the accompanying drawings,

Figure 1 is a diagrammatic representation of a motor embodying the features of the invention in one form.

Figure 2 is a diagram of a motor having the shunt resistance always connected around the armature, but provided with automatic means for rendering the line resistance effective and ineffective.

Figure 3 is a diagram resembling Figure 1, but showing a centrifugal device in place of a magnet for controlling the efficiency of the shunt resistance and the line resistance.

Figure 4 is a diagram like Figure 1, but showing only the circuits that are in use for starting the motor.

Figure 5 is a diagram similar to Figure 1, but showing only the circuits that are in use after the motor has reached the desired speed.

The motor when not running is connected up as seen in the partial diagram at Figure 4, field coil 10 (Figure 1) being in series with armature 11, and the current passing from the armature through leads 12, 13 to an automatic switch or relay 14, pivoted at 15 and contacting at 16 with a lead 17, which extends to the line at 19. The lead 17 may have an adjustable connection at 17$^a$ to a line resistance 18$^a$, (having also another function which will presently be explained) so as to regulate the amount of current initially flowing through the motor, thereby to control the starting torque.

The armature rotates at increasing speed, and the acceleration continues to a certain point, which is determined by the counter-electro-motive force developed, since the greater the counter-electro-motive force, the less current passes through the motor and the more current passes through a relay-solenoid or other magnet 20, which is connected in shunt around the armature by means of leads 12 and 22. Automatic relay 14 picks up when the voltage drop across the armature reaches a certain value. As the counter-electro-motive force increases, the less current passes through the armature and the more is diverted through the magnet 20, until finally the magnet becomes strong enough to swing up the relay or switch 14 about its pivot 15; this motion being effected against the tension of a light returning spring 24. The tension on the spring 24 may be adjusted by any ordinary or suitable means, so that the relay armature 14 will pick up at the desired armature speed. The switch 14 now cuts out the lead 17, and contacts at 25 with a lead 26, 27, in shunt around the armature, which includes a resistance 28, preferably adjustable. The active connections are now as seen at Figure 5, the current entering from a line 29 and passing through the field coil 10, and then being divided, part going through the armature 11 and part through shunt resistance 28, and all of the current then passing to the line 19 through a lead 30, Figure 1. The motor, therefore, when it reaches a certain speed, is automatically converted from a straight series motor into a shunt resistance motor.

There is preferably inserted in the solenoid or relay circuit a resistance 23, which may partly or wholly offset the resistance of the armature coils, so that at first a relatively small amount of current may be diverted through the magnet 20, whereby the main portion of the current may pass through the armature for producing a strong starting torque. This resistance 23 may be made adjustable at 23$^a$ as shown, and by using this resistance in series with the relay windings, the relay may be made to operate nearly the same on alternating as on direct current. In other words, the inductance of the relay windings will not matter much when operated from an alternating circuit. The relay may pick up at about the same armature potential, when the motor is operated on either alternating or direct current.

When the line resistance 18$^a$ is cut into circuit by the lifting of the automatic switch 14 by the magnet 20, less current flows through the motor and the magnet 20 becomes weaker; but it still remains strong enough to hold the switch 14 up to the dotted line position at Figure 1, inasmuch as said switch, which is in the nature of an armature, is closer to the magnet, which, although weakened, is still able to hold up the switch for that reason. When the current is shut off from the motor, the magnet can no longer hold up the switch 14, which accordingly drops to the full-line starting position at Figure 1, being aided by the return spring 24. The same thing will happen if the motor becomes stalled, thus reconverting the motor to a straight series motor and cutting out the lead 30 and the resistance 18$^a$ connected thereto.

Assuming that the resistance of the armature is say 5 ohms, and that the resistance of the series field is 5 ohms, it will be perceived that by introducing a resistance of say 50 ohms in shunt around the armature at 28, it results that the counter-electro-motive force cannot rise to the point usual in an ordinary series motor. This diminution of the counter-electro-motive force occurs because the rise in voltage at the brushes would cause the current, all of which passes through the field, to divide between the armature and the shunt resistance 28. As the counter-electro-motive force increases, less current passes through the armature, and more current is forced through the shunt resistance 28. The counter-electro-motive force cannot rise to such a point as to force all of the current from the mains through the shunt resistance 28. A certain counter-electro-motive force is reached at a definite stage. To safeguard against too great a flow of current from the line, line resistance 18$^a$ is connected in the lead 30, said line resistance being say 20 ohms, which limits the motor-speed and prevents burning out the shunt 28 and other coils. Thus, after the relay picks up, the motor takes less current because the resistance 18$^a$ is then in series with the motor armature and field; this being one of the principal functions of said resistance.

It is noted that the adjustable resistance 18$^a$ in series with the whole motor, may be wholly or partly cut out of circuit, by adjustment 17ᵃ, to give the desired starting torque when the motor is starting up under load; and that said resistance 18ᵃ is also adjustable at 32 for the desired current that the motor is to consume while operating.

It will be understood that by placing a low-resistance field coil 10 in series with armature 11, the advantage is preserved of using a relatively small number of windings in the field coil, and that over-speeding of the motor is overcome by the expedient of automatically connecting the resistance 28 in shunt around the armature. A substantial current passes from the line through the field coil 10 independently of the armature, so that the field coil will not become unduly weakened by reason of the counter-electro-motive force sent into the line by the armature; although the value of the counter-electro-motive force determines the amount of current which flows around the armature through said resistance. Hence when the load is removed from the motor and the latter tends to run faster, there does not occur an over-reduction in the power of the field magnet, and hence the armature can generate the requisite counter-electro-motive force without over-speeding. It results that the speed of the motor will not vary to an objectionable extent under variations of load, thus overcoming the objection of over-speeding heretofore found with series field motors. In other words, the armature 11 can never rotate to such a speed that the counter-electro-motive force will cause all of the current to pass through the resistance 28, so that it follows that there is a speed reached by the armature where the counter-electro-motive force is such as to cause part of the current to flow through the resistance 28 and part through the armature, resulting in the substantially constant speed of the armature.

By the provision of an adjustment at 31 of the resistance 28 in the shunt circuit, the speed of rotation of the motor may be varied at will. If an adjustment is made so as to include but a little resistance, the current will flow almost entirely through the shunt 28, so that only a feeble current will pass through the armature. On the other hand, if adjustment is made to include a great resistance in the shunt 28, the current will be forced to pass mainly through the armature, thereby developing correspondingly strong torque.

It will be seen that the outside rheostat 18ᵃ, 32 controls the amount of current consumed by the motor, while the shunt rheostat 28, 31 may control the current consumed by the armature and thereby control the armature speed, without substantially varying the current which passes through the field 10.

The motor is adjustable substantially to constant speed whether operated on direct current or alternating current. The adjustable resistance 28 in parallel with the armature is for adjusting to the desired substantially constant speed over a wide range. The adjustable resistance 18ᵃ is in series with the motor, so that the motor can run on any voltage, either alternating current or direct current. The current through the resistance 28 is not always the same, because the voltage across the armature varies with the speed.

The resistance unit 18ᵃ, 32, in series with the complete motor circuit, permits the use of the motor over a great range in voltage, say from 250 volts to 50 volts, to maintain a constant current.

At Figure 2 is shown a form of motor in which a shunt resistance 33 is always in circuit, and its adjustment 34 may correspond to 31 at Figure 1. For economy the relay circuit 20 may be included in the shunt 33 by means of a lead 35, so that the adjustable resistance 23, 23ᵃ may be omitted. The current flowing in through the field at 10, Figure 2, is divided, part of it flowing through the armature 11, and part through the shunt resistance 33, and hence through the relay 20. The circuits rejoin at 37, and practically the whole current from 37 may flow on through lead 38 and switch or relay 36 (corresponding to 14), and also through lead 17, to the line 19. The principal portion of the line resistance 18ᵃ is practically short-circuited by the parts 36, 37, 38, at the start of the motor, so that a good starting torque is assured. When the motor speeds up, the voltage drop across the armature will reach such a point that the relay magnet at 20 is energized sufficiently to open the switch 36, and the by-pass is cut out, and the armature circuit may be regarded as rejoining the shunt circuit 33 at 39, the entire current now flowing through a lead 40 and adjustment 32 and through the entire line resistance 18ᵃ (adjustable at 32), which is thus, in effect, cut into circuit by the opening of the relay 36. This limits the speed of the motor and prevents burning out of the shunt resistance coil 33. In this motor, at Figure 2, said resistance 33 has the protection or benefit of the main resistance coil 18ᵃ, but the starting torque of the motor is less than at Figures 1, 4 and 5. After the resistance 18ᵃ has been thus brought to efficiency by opening the switch 36, the motor runs in about the same manner as the motor seen at Figure 1. It should be explained that the line resistance 18ᵃ, at Figure 2, is always entirely in circuit with the armature, the field, and the shunt resistance 33; but the normally closed switch 36 affords an easy by-path or short circuit through which occurs the main flow of the current to the line 19, and only a small portion of the current at this time flowing through 32 and 18ᵃ. This condition is maintained until the switch 36 opens, whereupon the resistance 18ᵃ is brought fully into use, to an extent determined by the adjustment at 32.

In the form of the invention seen at Figure 3, the motor corresponds to Figure 1, except that, in place of the relay at 14, 20, there is employed a centrifugal device to control both the cutting into circuit of the shunt resistance 28 and the disconnection of the short circuit 17. This centrifugal device may comprise a collar 41 fixed upon the motor shaft 42 and having spring arms 43, each carrying a weight 44; the opposite ends of the spring arms being loosely connected to a collar or hub 45 of a disk 46, so that said disk may be moved axially of the motor shaft by the flexing of the spring arms 43, as the revolving weights 44 fly apart. When the motor is at rest, the current coming in through the field 10 passes through the armature 11 and thence through a lead 47 and a switch or relay 48 to a contact 49 provided upon lead 17, and thence through a fragment of the resistance 18ᵃ to the line. A weak current may also flow through 40 and the entire resistance 18ᵃ to the line. However, resistance 18ᵃ is practically short-circuited, and its effect is therefore slight, so that the motor has a strong initial torque and starts up quickly. Upon reaching a speed sufficient to cause the weights 44 to fly apart, the disk 46 is drawn to the right at Figure 3, and operates a forked arm 50 provided upon switch 48 (pivoted at 51), whereby the switch is swung away from the contact 49, thus cutting out the by-path 17 for the current, so that the current can flow only through the entire resistance 18ᵃ, whose length is determined by the adjustment 32. The shunt resistance 28 is still out of circuit, and the motor continues to increase in speed, even after the short circuit 17 is cut out. Eventually, the weighted springs 44 fly so far apart that the switch 48 is swung over against a contact 52. From this point a lead 53 extends to the adjustment 31 of the shunt resistance 28, whereby said shunt resistance is cut into circuit, and thereafter keeps the speed of the motor substantially uniform in the manner already explained with reference to the form of the invention seen at Figure 1. The pull of the weights 44 may be sufficiently strong to hold the switch 48 against the contact 52 until the motor becomes stalled or until the current is cut off, whereupon the springs 43 will assume their normal conditions, thrusting the disk 46 to the left and swinging the switch 48 to the normal position of engagement with the contact at 49.

It will be understood that where the term "resistance" or "resistor" is used in the description and claims, this term is meant to include and stand for mere equivalents in the art of obstructing the flow of the current.

Variations may be resorted to within the scope of the invention, and portions of the improvements may be used without others.

Having thus described my invention, I claim:

1. A motor having its armature coil in series with its field coil, and having normally-disconnected resistors in series with the armature coil and in shunt around the armature respectively, means including a relay coil responsive to the potential of the motor for causing the motor to effect automatic connections of said resistors, and an adjustable resistor in series with the relay coil, whereby the current passing through the field coil will be divided between the armature and the shunt resistor.

2. A motor having a field coil in series with its armature, an automatic relay or switch in shunt around the armature, a resistor normally idle but brought into shunt around the armature by a movement of said relay effected by the motor, and means for concomitantly rendering effective a line resistor in series with the whole motor.

3. A motor having a field coil in series with its armature, an automatic relay or switch in shunt around the armature, a resistor normally idle but connected in shunt around the armature by a movement of said relay effected by the motor, means for concomitantly rendering effective a line resistor in series with the whole motor, and means for adjusting said line resistor independently of the shunt resistor while the latter is connected.

4. In an electric motor, the combination with an armature coil and a field coil, of a rheostat to control the starting torque of the motor, an independently adjustable rheostat, means automatically operable to insert said last-mentioned rheostat in shunt around the armature coil to control the speed of the motor, and independently adjustable means for offering additional resistance to the flow of current through the whole motor.

ALFRED E. OSWALD.